(12) United States Patent
Graunke et al.

(10) Patent No.: US 7,043,021 B2
(45) Date of Patent: *May 9, 2006

(54) DIGITAL VIDEO CONTENT TRANSMISSION CIPHERING AND DECIPHERING METHOD AND APPARATUS

(75) Inventors: Gary L. Graunke, Hillsboro, OR (US); David A. Lee, Beaverton, OR (US); Robert W. Faber, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 34 days.

This patent is subject to a terminal disclaimer.

(21) Appl. No.: 10/825,009

(22) Filed: Apr. 14, 2004

(65) Prior Publication Data

US 2004/0202321 A1    Oct. 14, 2004

Related U.S. Application Data

(63) Continuation of application No. 09/385,592, filed on Aug. 29, 1999, now Pat. No. 6,731,758.

(51) Int. Cl.
*H04N 7/167* (2006.01)

(52) U.S. Cl. ............ 380/239; 380/201; 380/226; 380/223

(58) Field of Classification Search ........ 380/239, 380/201, 223, 226
See application file for complete search history.

(56) References Cited

U.S. PATENT DOCUMENTS

| | | | |
|---|---|---|---|
| 3,798,360 A | 3/1974 | Feistel | |
| 4,004,089 A | 1/1977 | Richard et al. | |
| 4,316,055 A | 2/1982 | Feistel | |
| 4,605,820 A | 8/1986 | Campbell, Jr. | |
| 4,607,137 A | 8/1986 | Jansen et al. | |
| 4,613,901 A | 9/1986 | Gilhousen et al. | |
| 4,641,102 A | 2/1987 | Coulthart et al. | |
| 4,953,208 A | 8/1990 | Ideno | |
| 4,991,208 A | 2/1991 | Walker et al. | |
| 5,020,106 A | 5/1991 | Rabold et al. | |
| 5,195,136 A | 3/1993 | Hardy et al. | |
| 5,341,425 A | 8/1994 | Wasilewski et al. | |
| 5,341,426 A | 8/1994 | Barney et al. | |

(Continued)

FOREIGN PATENT DOCUMENTS

EP    0 599 366    2/1993

(Continued)

OTHER PUBLICATIONS

Bruce Schneier et al., Unbalanced Feistel Networks and Block-Cipher Design, Feb. 1996, Third International Workshop Proceedings, pp. 1-24.

(Continued)

*Primary Examiner*—Gilberto Barron
*Assistant Examiner*—Grigory Gurshman
(74) *Attorney, Agent, or Firm*—Blakely, Sokoloff, Taylor & Zafman LLP

(57) ABSTRACT

A video source device generates a session key for each transmission session wherein a multi-frame video content is to be transmitted to a video sink device. The video source device uses the session key to generate a successive number of frame keys. The frame keys in turn are used to generate corresponding pseudo random bit sequences for ciphering the corresponding frames to protect the video content from unauthorized copying during transmission. The video sink device practices a complementary approach to decipher the received video content. In one embodiment, both devices are each provided with an integrated block/stream cipher to practice the transmission protection method.

58 Claims, 5 Drawing Sheets

U.S. PATENT DOCUMENTS

| | | | |
|---|---|---|---|
| 5,509,073 | A | 4/1996 | Monnin |
| 5,533,127 | A | 7/1996 | Luther |
| 5,590,194 | A | 12/1996 | Ryan |
| 5,621,799 | A | 4/1997 | Katta et al. |
| 5,657,095 | A | 8/1997 | Yoshida et al. |
| 5,673,319 | A | 9/1997 | Bellare et al. |
| 5,680,131 | A | 10/1997 | Utz |
| 5,825,879 | A | 10/1998 | Davis |
| 5,852,472 | A | 12/1998 | Prasad et al. |
| 5,862,150 | A | 1/1999 | Lavelle et al. |
| 5,940,509 | A | 8/1999 | Jovanovich et al. |
| 6,005,940 | A | 12/1999 | Kulinets |
| 6,061,449 | A | 5/2000 | Candelore et al. |
| 6,118,873 | A | 9/2000 | Lotspiech et al. |
| 6,167,136 | A | 12/2000 | Chou |
| 6,345,101 | B1 | 2/2002 | Shukla |
| 6,452,959 | B1 | 9/2002 | McDonough |
| 6,453,304 | B1 | 9/2002 | Manabu et al. |
| 6,466,669 | B1 | 10/2002 | Matsui et al. |
| 6,731,758 | B1 * | 5/2004 | Graunke et al. ............ 380/239 |

FOREIGN PATENT DOCUMENTS

| | | |
|---|---|---|
| WO | WO 96-06504 | 2/1996 |
| WO | WO 99/18729 | 4/1999 |
| WO | WO 99/19822 | 4/1999 |
| WO | WO 01-17251 | 3/2001 |
| WO | WO 01/17252 A1 | 3/2001 |

OTHER PUBLICATIONS

William Stallings, "Cryptography and Network Security", Jun. 4, 1998, Prentice-Hall, Inc. 2nd Edition, Chapter 3.

Infocus Corporation, Digital Visual Interface (DVI) white paper, Nov. 2001, pp. 1-15.

Silicon Image, High-Bandwidth Digital Content Protection white paper, Feb. 2000, pp. 1-11.

High-Bandwidth Digital Content Protection System, Revision 1.0, Feb. 17, 2000, copyright © 1999-2000 by Intel Corporation, pp. 1-59.

Bruce Schneier, "Applied Cryptography : protocols, algorithms, and source code in C", Second Edition, Library of Congress, Copyright 1996, Chapters 2-6 and 12-17.

Search Report for PCT/US 00/22785, mailed Dec. 6, 2000, 2 pages.

Search Report for PCT/US 00/22834, mailed Dec. 4, 2000, 1 page.

Written Opinion for PCT/US00/22834; 1 page.

Written Opinion for PCT/US/00/22785; 1 page.

International Preliminary Examination Report PCT/US00/22/34, 6 pages, mailed Nov. 19, 2001.

International Preliminary Examination Report PCT/US00/22785, 7 Pages, mailed Nov. 5, 2001.

Heys, Howard M., "An Analysis of the Statistical Self-synchronization of Stream Ciphers", IEEE INFORCOM 2001, pp. 897-904.

Heys, Howard M., Delay Characteristics of Statistical Cipher Feedback-Mode, IEEE 2001, pp. 5-9.

Simmons, Gustavus J., Symmetric and Asymmetric Encryption, Computing Surveys, vol. 11, No. 4, Dec. 1979, pp. 305-330.

The Art of Computer Programming, vol. 2/Seminumerical Algorithms, © 1969, Addison-Wesley Publishing Company, Inc., Reading Massachusettts; Menlo Park, California; London; Amsterdam; Don Mills, Ontario; Sydney, pp. 30-31.

* cited by examiner

US 7,043,021 B2

DIGITAL VIDEO CONTENT TRANSMISSION CIPHERING AND DECIPHERING METHOD AND APPARATUS

RELATED APPLICATIONS

This application is a Continuation of application Ser. No. 09/385,592, now U.S. Pat. No. 6,731,758, entitled "DIGITAL VIDEO CONTENT TRANSMISSION CIPHERING AND DECIPHERING METHOD AND APPARATUS", filed on Aug. 29, 1999.

BACKGROUND OF THE INVENTION

1. Field of the Invention

The present invention relates to the field of content protection. More specifically, the present invention addresses the provision of protection to digital video content to facilitate their secure transmission from a video source device to a video sink device.

2. Background Information

In general, entertainment, education, art, and so forth (hereinafter collectively referred to as "content") packaged in digital form offer higher audio and video quality than their analog counterparts. However, content producers, especially those in the entertainment industry, are still reluctant in totally embracing the digital form. The primary reason being digital contents are particularly vulnerable to pirating. As unlike the analog form, where some amount quality degradation generally occurs with each copying, a pirated copy of digital content is virtually as good as the "gold master". As a result, much efforts have been spent by the industry in developing and adopting techniques to provide protection to the distribution and rendering of digital content.

Historically, the communication interface between a video source device (such as a personal computer) and a video sink device (such as a monitor) is an analog interface. Thus, very little focus has been given to providing protection for the transmission between the source and sink devices. With advances in integrated circuit and other related technologies, a new type of digital interface between video source and sink devices is emerging. The availability of this type of new digital interface presents yet another new challenge to protecting digital video content. While in general, there is a large body of cipher technology known, the operating characteristics such as the volume of the data, its streaming nature, the bit rate and so forth, as well as the location of intelligence, typically in the source device and not the sink device, present a unique set of challenges, requiring a new and novel solution.

SUMMARY OF THE INVENTION

A session key is generated by a video source device for each transmission session wherein a multi-frame video content is to be transmitted to a video sink device. The video source device in turn uses at least the session key to generate a successive number of frame keys to facilitate ciphering of corresponding frames of the multi-frame video content for transmission to the video sink device.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
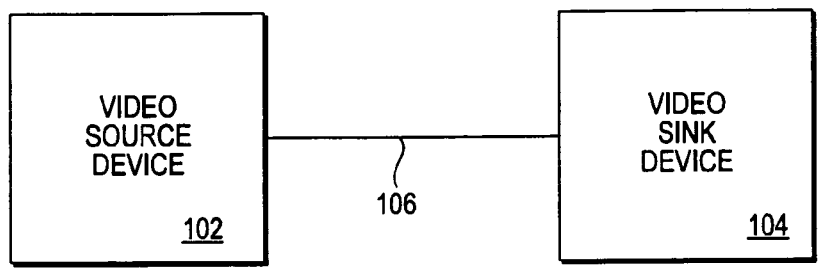
FIG. 1 illustrates an overview of the present invention in accordance with one embodiment.

Referring now to FIG. 1, wherein a block diagram illustrating an overview of the present invention, in accordance with one embodiment is shown. As illustrated, video source device 102 and video sink device 104 are coupled to each other by digital video link 106. Video source device 102 provides video content to video sink device 104 through digital video link 106. In accordance with the present invention, video source device 102 and video sink device 104 are equipped to be able to jointly practice a symmetric ciphering/deciphering process. As a result, video content may be provided in a more robust ciphered digital form from video source device 102 to video sink device 104 through video link 106, making it more difficult to pirate video content during transmission.

Except for the teachings of the present invention incorporated, to be described more fully below, video source device 102 and video sink device 104 are both intended to represent a broad range of such devices known in the art. Examples of video source devices include but not limited to computers of all sizes (from palm size device to desktop device, and beyond), set-up boxes, or DVD players, whereas examples of video sink devices include but not limited to CRT monitors, flat panel displays or television sets. Digital video link 106 may be implemented in any one of a number of mechanical and electrical forms, as long as they are consistent with the operating requirement (i.e. speed, bit rate and so forth), and a mechanism (which may be in hardware or through protocol) is provided to allow control information to be exchanged between video source and sink devices 102 and 104 (hereinafter, simply source and sink devices respectively).

Figure 2:
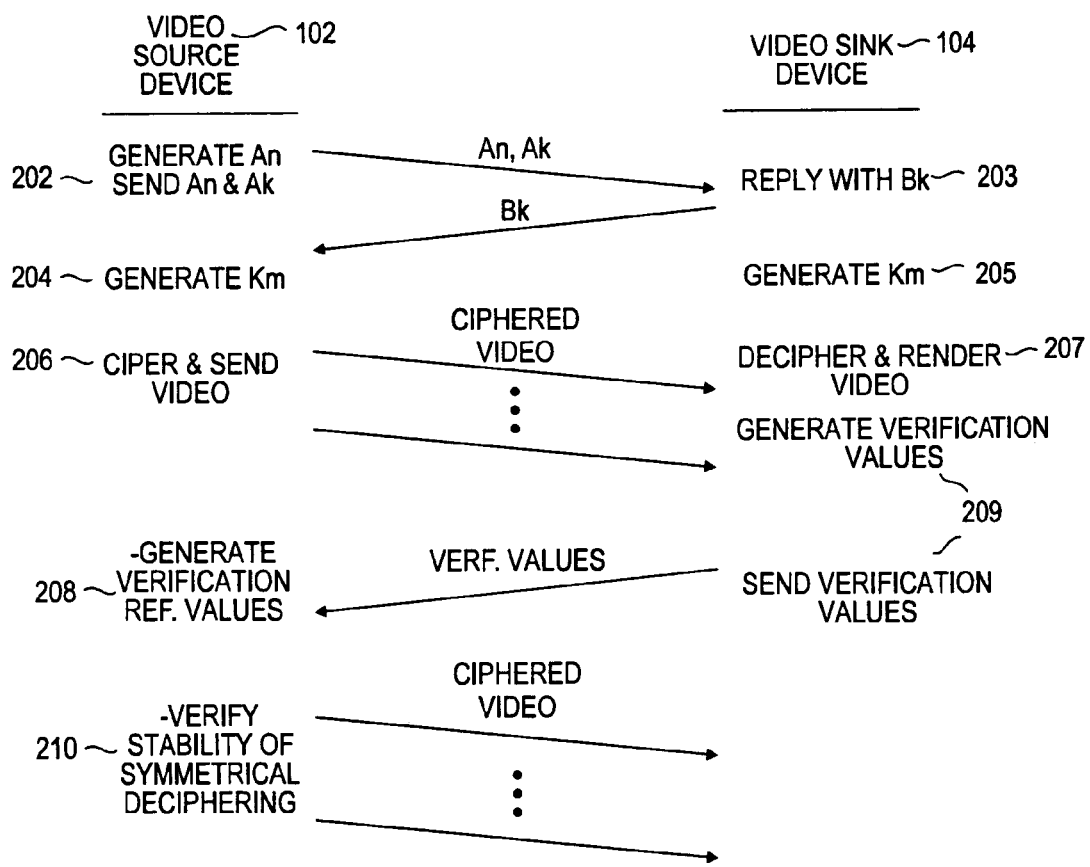
FIG. 2 illustrates a symmetric ciphering/deciphering process based method for providing video content from a source device to a sink device, in accordance with one embodiment.

FIG. 2 illustrates an overview of the symmetric ciphering/deciphering process based method for providing video content from a source device to a sink device, in accordance with one embodiment. In this embodiment, source and sink devices 102 and 104 are assumed to have each been provided with an array of private keys and a complementary identifier by a certification authority. As illustrated, upon power on or reset, source device 102 first provides a basis value to the symmetric ciphering/deciphering process to sink device. 104 (block 202). For the illustrated embodiment, the basis value is a random number (An). An may be generated in any one of a number of techniques known in the art. Additionally, source device 102 also provides its identifier (Ak) to sink device 104 (block 202). In response, sink device 104 replies with its identifier (Bk) (block 203). Upon exchanging the above information, source and sink devices 102 and 104 independently generate their respective copies of an authentication key (Km) using Ak and Bk (block 204 and 205). For the illustrated embodiment, source device 102 generates its copy of Km by summing private keys of its provided array indexed by Bk, while sink device 104 generates its copy of Km by summing private keys of its provided array indexed by Ak. At this time, if both source and sink devices 102 and 104 are authorized devices, they both possess and share a common secret authentication key Km.

In one embodiment, each of source and sink devices 102 and 104 is pre-provided with an array of 40 56-bit private keys by the certification authority. An is a 64-bit random number, and Km is 56-bit long. For more information on the above described authentication process, see U.S. patent application, Ser. No. 09/275,722, filed on Mar. 24, 1999, entitled Method and Apparatus for the Generation of Cryptographic Keys, having common inventorship as well as assignee with the present application.

Having authenticated sink device 104, source device 102 ciphers video content into a ciphered form before transmitting the video content to sink device 104. Source device 102 ciphers the video content employing a symmetric ciphering/deciphering process, and using the random number (An) as well as the independently generated authentication key (Km) (block 206). Upon receipt of the video content in ciphered form, sink device 104 deciphers the ciphered video content employing the same symmetric ciphering/deciphering processing, and using the provided An as well as its independently generated copy of Km (block 207).

In accordance with the present invention, as an integral part of ciphering video content, source device 102 derives a set of verification reference values in a predetermined manner (block 208). Likewise, as an integral part of symmetrically deciphering video content sink device 104 also derives a set of verification values in a predetermined manner, and transmits these derived verification values to source device 102 (block 209). Upon receiving each of these verification values, source device 102 compares the received verification value to the corresponding one of the verification reference value to determine and confirm that indeed the ciphered video content is being properly deciphered by sink device 104 (block 210).

For the illustrated embodiment, both source and sink devices 102 and 104 generate the verification reference and verification values continuously, but the verification values are provided from sink device 104 to source device 102 periodically at predetermined intervals.

In one embodiment, the verification reference and verification values are all 64-bit in length, and sink device 104 provides source device 102 with verification values at initialization and every $64^{th}$ frames thereafter.

Figure 3B:
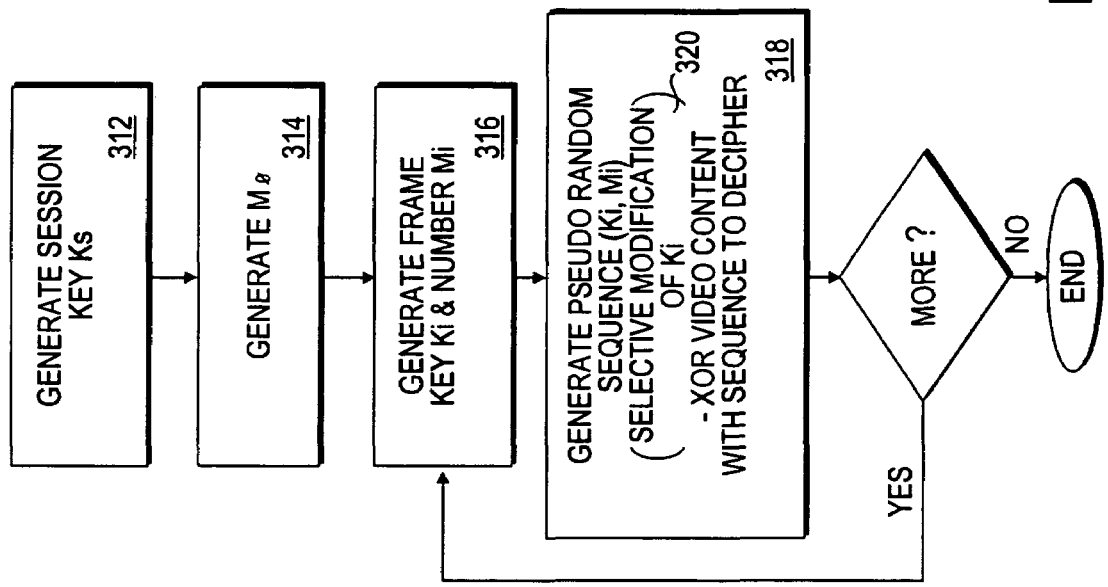
FIGS. 3a–3b illustrate the symmetric ciphering/deciphering process of FIG. 2, in accordance with one embodiment.
Figure 3A:
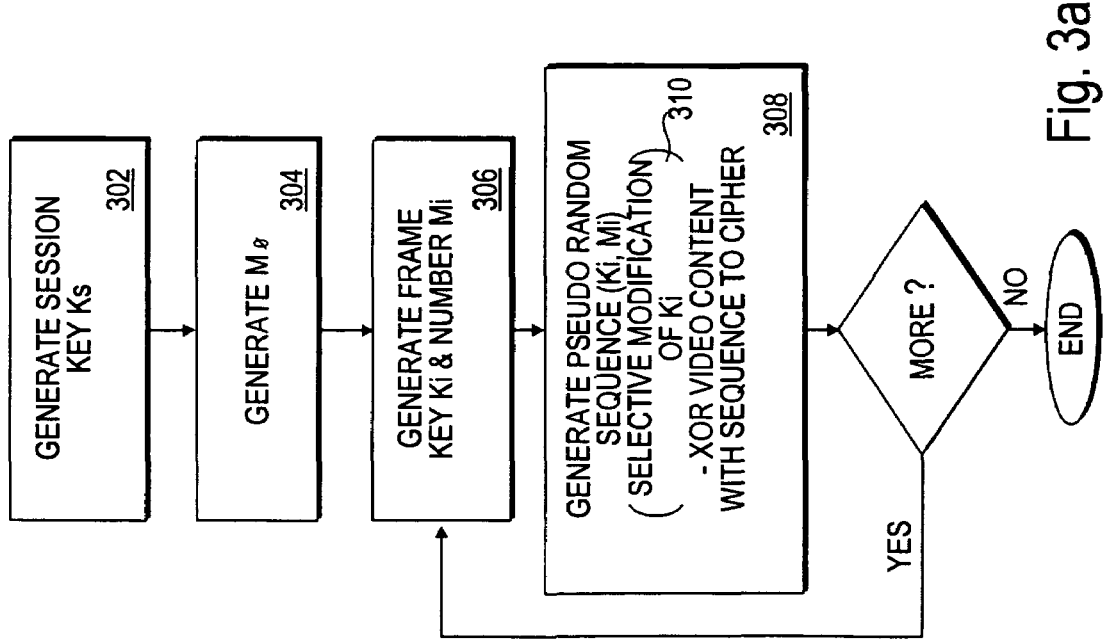

FIGS. 3*a*–3*b* illustrate the symmetric ciphering/deciphering process in further detail, in accordance with one embodiment. In this embodiment, the video content is assumed to be a multi-frame video content with each frame having multiple lines of video content. In between two lines of a frame is an interval to allow a sink device to horizontally "retrace" itself, commonly known as the horizontal retrace interval or horizontal blanking interval (HBI). Likewise, in between two frames is an interval to allow a sink device to vertically "retrace" itself, commonly known as the vertical retrace interval or vertical blanking interval (VBI).

Source device 102 first generates a session key (Ks) for the transmission session (block 302). For the illustrated embodiment, Ks is generated by block ciphering the above mentioned random number An using the authentication key Km as the block cipher key and applying C1 clocks. The duration of a transmission session is application dependent. Typically, it corresponds to a natural demarcation of the video content, e.g. the transmission of a single movie may constitute a transmission session, or the transmission of an episode of a sitcom may constitute a transmission session instead.

Upon generating the session key Ks, source device 102 generates an initial version of a second random number (M0) (block 304). For the illustrated embodiment, source device 102 first generates a pseudo random bit sequence (at p-bit per clock) using a stream cipher with the above described random number An and the session key Ks (in two roles, as another input random number and as the stream cipher key), applying C2 clocks. Source device 102 derives M0 from the pseudo random bit sequence, as the bit sequence is generated.

Next, source device 102 generates a frame key (Ki) for the next frame (block 306). For the illustrated embodiment, Ki is generated by block ciphering an immediately preceding version of the second random number Mi−1 using the session key Ks as the block cipher key, and applying C3 clocks. That is, for the first frame, frame-1, frame key K1 is generated by block ciphering the above described initial version of the second random number M0, using Ks, and applying C3 clocks. Additionally, this operation is subsequently repeated at each vertical blanking interval for the then next frame, frame-2, frame-3, and so forth.

Upon generating the frame key Ki, source device 102 generates the current version of the second random number (Mi) (block 302). For the illustrated embodiment, source device 102 first generates a pseudo random bit sequence (at p-bit per clock) using a stream cipher with the previous version of the second random number Mi−1 and the frame key Ki (in two roles, as another input random number and as the stream cipher key), applying C4 clocks. Source device 102 derives Mi from the pseudo random bit sequence, as the bit sequence is generated.

Upon generating the current version of the second random number Mi, source device 102 again generates a pseudo random bit sequence (at p-bit per clock) to cipher the frame (block 308). For the illustrated embodiment, source device 102 generates the pseudo random bit sequence using a stream cipher with an immediately preceding version of the second random number Mi−1 and frame key Ki (in two roles, as another input random number and the stream cipher key), applying C5 clock cycles. The video content is ciphered by perform an exclusive-OR (XOR) operation on the video stream and the pseudo random bit sequence. The pseudo random bit sequence is generated preferably at a rate sufficient to cipher a pixel of RGB signal per clock. Therefore, C5 is equal to the number of bits per pixel multiply by the number of pixels per line, as well as the number of lines per frame.

For the illustrated embodiment, a stream cipher that successively transforms Mi and Ki in the course of generating the pseudo random bit sequence is employed. Additionally, the robustness of the ciphered video content is further strengthened by increasing the unpredictability of the pseudo random bit sequence through successive modification of then current states of Ki at the horizontal blanking intervals of the frame (block 310).

Over in sink device 104, in like manner, it first generates a session key (Ks) for the transmission session (block 312). Upon generating the session key Ks, sink device 104 generates an initial version of the second random number (MO) (block 314). Next, sink device 104 generates the frame key (Ki) and second random number (Mi) for the next frame (block 316). This operation is likewise subsequently repeated at each vertical blanking interval for the then next frame. In the meantime, after generation of each frame key Ki and Mi, sink device 104 generates a corresponding pseudo random bit sequence to decipher the frame (block 318). The ciphered video content is deciphered by performing an exclusive-OR (XOR) operation on the video stream and the corresponding pseudo random bit sequence. Sink device 104 also employs a stream cipher that successively transforms Mi and Ki in the course of generating the pseudo random bit sequence. Furthermore, Ki is successively modified at the horizontal blanking intervals of the frame (block 320). Ki, the pseudo random bit sequence, and Mi are symmetrically generated as earlier described for source device 102.

In one embodiment, Ks and each Ki are both 84-bit in length. C1 and C3 are both 48 clocks in length. Each pixel is 24-bit, and the pseudo random bit sequence is generated at 24-bit per clock. Each Mi is 64-bit in length, C3 and C4 are 56 clocks in length. Each 64-bit Mi is formed by concatenating the "lower" 16-bit stream cipher output of each of the last four clocks.

Accordingly, video content may be advantageously transmitted in ciphered form with increased robustness from source device 102 to sink device 104 through link 106 with reduced pirating risk.

Figure 4:
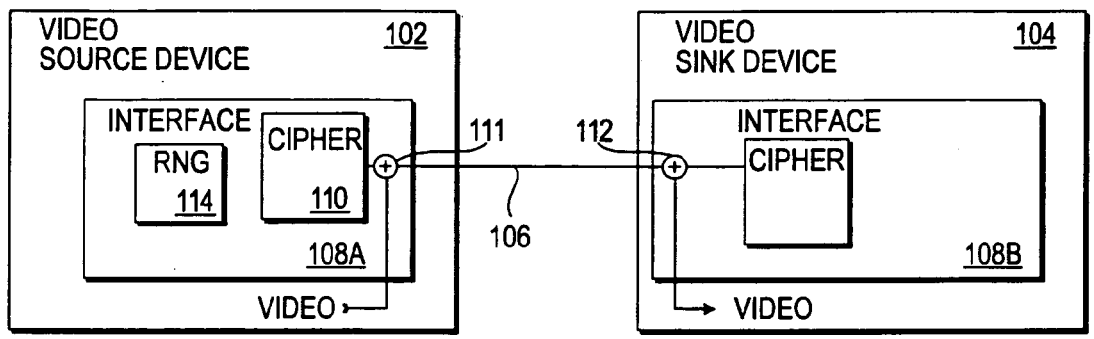
FIG. 4 illustrates video source and sink devices of FIG. 1 in further detail, in accordance with one embodiment.

FIG. 4 illustrates video source and sink devices of FIG. 1 in further detail, in accordance with one embodiment. As shown, video source and sink devices 102 and 104 include interfaces 108a and 108b disposed at the respective end of link 106. Each of interfaces 108a and 108b is advantageously provided with cipher 110 of the present invention and XOR 112 to practice the video content protection method of the present invention as described above. Additionally, for ease of explanation, interface 108a is also shown as having been provided with a separate random number generator 114. Except for interfaces 108a and 108b, as stated earlier, video source and sink devices 102 and 104 are otherwise intended to represent a broad category of these devices known in the art.

Random number generator 114 is used to generate the earlier described random number An. Random number generator 114 may be implemented in hardware or software, in any one of a number of techniques known in the art. In alternate embodiments, as those skilled in the art will appreciate from the description to follow, cipher 110 may also used to generate An, without the employment of a separate random number generator.

Cipher 110 is a novel combined block/stream cipher capable of operating in either a block mode of operation or a stream mode of operation. To practice the video content protection method of the present invention, cipher 110 is used in block mode to generate the above described session key Ks and frame keys Ki, and in stream mode to generate the pseudo random bit sequences for the various frames (and indirectly Mi, as they are derived from the respective bit sequences).

In source device 102, XOR 112 is used to cipher video content, combining it with the pseudo random bit sequences generated by cipher 110 on interface 108a. Over in sink device 104, XOR 112 is used to decipher ciphered video content, combining it with the pseudo random bit sequences generated by cipher 110 on interface 108b.

Figure 5:
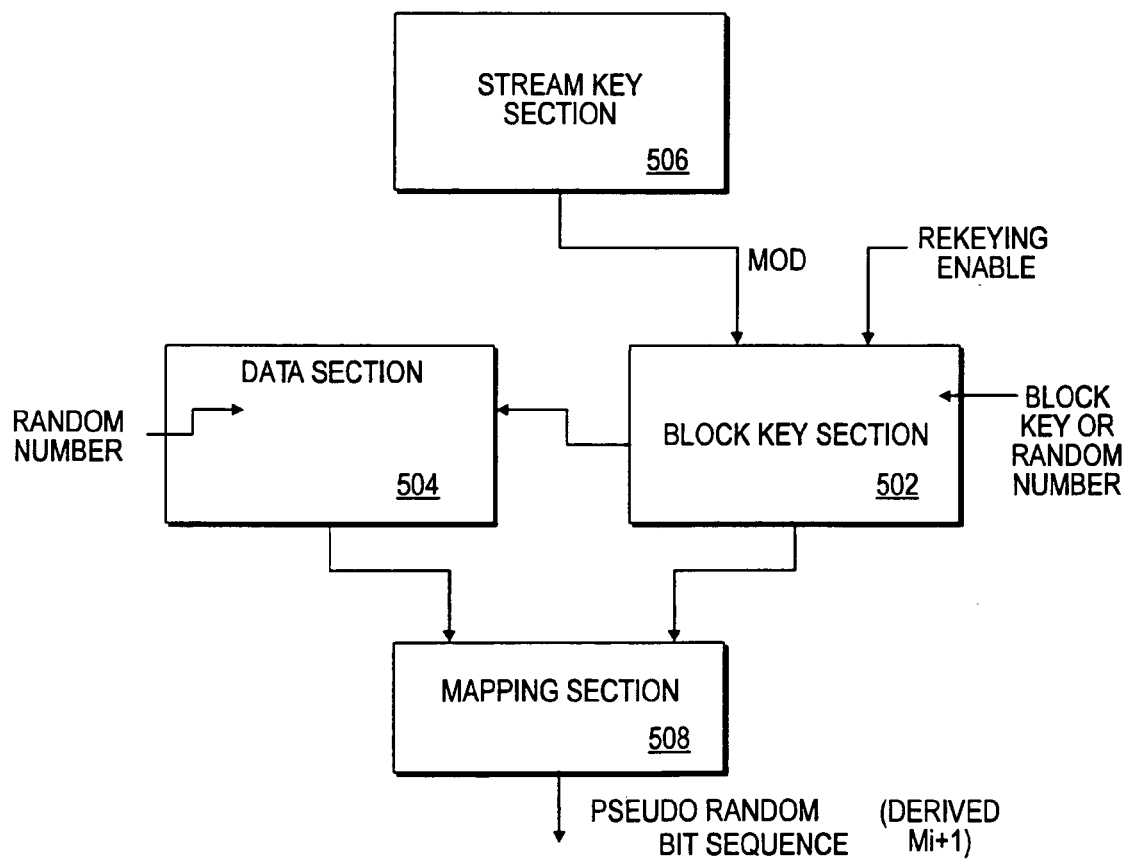
FIG. 5 illustrates the combined block/stream cipher of FIG. 4 in further detail, in accordance with one embodiment.

FIG. 5 illustrates the combined block/stream cipher of FIG. 4 in further detail, in accordance with one embodiment. As illustrated, combined block/stream cipher 110 includes block key section 502, data section 504, stream key section 506, and mapping section 508, coupled to one another. Block key section 502 and data section 504 are employed in both the block mode as well as the stream mode of operation, whereas stream key section 506 and mapping section 508 are employed only in the stream mode of operation.

Briefly, in block mode, block key section 502 is provided with a block cipher key, such as the earlier described authentication key Km or the session key Ks; whereas data section 504 is provided with the plain text, such as the earlier described random number An or the derived random number Mi−1. "Rekeying enable" signal is set to a "disabled" state, operatively de-coupling block key section 502 from stream key section 506. During each clock cycle, the block cipher key as well as the plain text are transformed. The block cipher key is independently transformed, whereas transformation of the plain text is dependent on the transformation being performed on the block cipher key. After a desired number of clock cycles, the provided plain text is transformed into ciphered text. For the earlier described video content protection method, when block key section 502 is provided with Km and data section 504 is provided with the An, ciphered An is read out and used as the session key Ks. When block key section 502 is provided with Ks and data section 504 is provided with the Mi−1, ciphered Mi−1 is read out and used as the frame key Ki.

To decipher the ciphered plain text, block key section 502 and data section 504 are used in like manner as described above to generate the intermediate "keys", which are stored away (in storage locations not shown). The stored intermediate "keys" are then applied to the ciphered text in reversed order, resulting in the deciphering of the ciphered text back into the original plain text. Another approach to deciphering the ciphered text will be described after block key section 502 and data section 504 have been further described in accordance with one embodiment each, referencing FIGS. 6–7.

In stream mode, stream key section 506 is provided with a stream cipher key, such as the earlier described session key Ks or frame key Ki. Block key section 502 and data section 504 are provided with random numbers, such as the earlier described session/frame keys Ks/Ki and the derived random numbers Mi−1. "Rekeying enable" signal is set to an "enabled" state, operatively coupling block key section 502 to stream key section 506. Periodically, at predetermined intervals, such as the earlier described horizontal blanking intervals, stream key section 506 is used to generate one or more data bits to dynamically modify the then current state of the random number stored in block data section 502. During each clock cycle, in between the predetermined intervals, both random numbers stored in block key section 502 and data section 504 are transformed. The random number provided to block key section 502 is independently transformed, whereas transformation of the random number provided to data section 504 is dependent on the transformation being performed in block key section 502. Mapping block 506 retrieves a subset each, of the newly transformed states of the two random numbers, and reduces them to generate one bit of the pseudo random bit sequence. Thus, in a desired number of clock cycles, a pseudo random bit sequence of a desired length is generated.

For the illustrated embodiment, by virtue of the employment of the "rekeying enable" signal, stream key section 506 may be left operating even during the block mode, as its outputs are effectively discarded by the "rekeying enable" signal (set in a "disabled" state).

Figure 6:
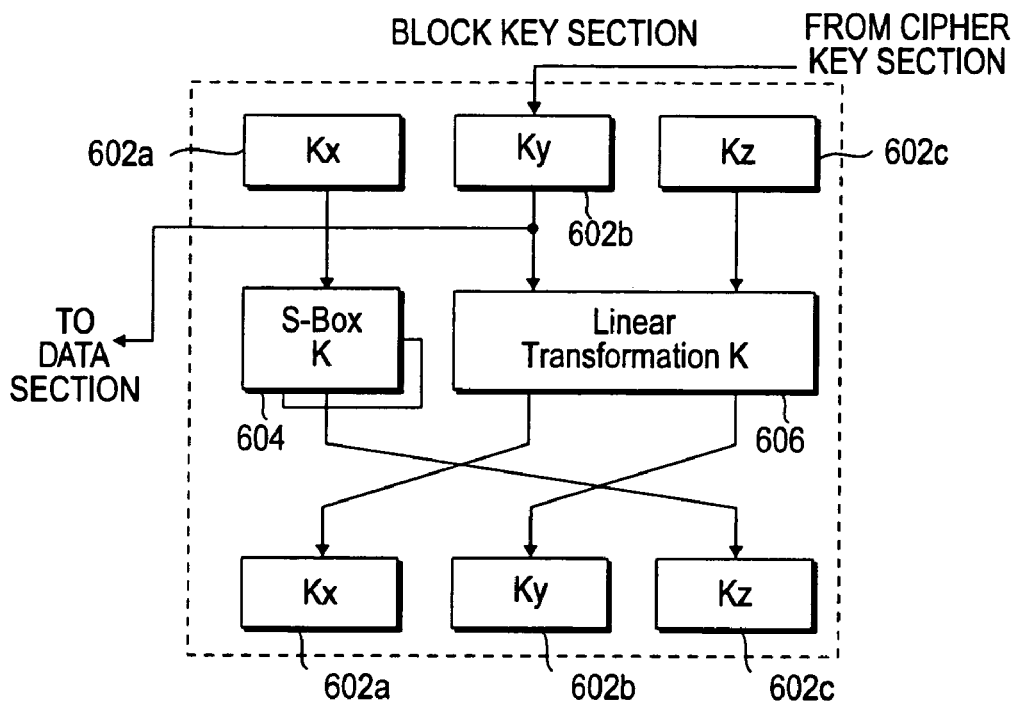
FIG. 6 illustrates the block key section of FIG. 5 in further detail, in accordance with one embodiment.

FIG. 6 illustrates the block key section of FIG. 5 in further detail, in accordance with one embodiment. As illustrated, block key section 502 includes registers 602a–602c, substitution boxes 604, and linear transformation unit 606. In block mode, registers 602a–602c are collectively initialized to a block cipher key, e.g. authentication key Km or session key Ks. In stream mode, registers 602a–602c are collectively initialized to a random number, e.g. session key Ks or frame key Ki. Each round, substitution boxes 604 and linear transformation unit 606 modify the content of registers 602a–602c. More specifically, substitution boxes 604 receive the content of register 602a, modify it, and then store the substituted content into register 602c. Similarly, linear transformation unit 606 receives the content of registers 602b and 602c, linearly transforms them, and then correspondingly stores the linearly transformed content into registers 602a and 602b.

Substitution boxes 604 and linear transformation unit 606 may be implemented in a variety of ways in accordance with well known cryptographic principles. One specific implementation is given in more detail below after the description of FIG. 7.

Figure 7:
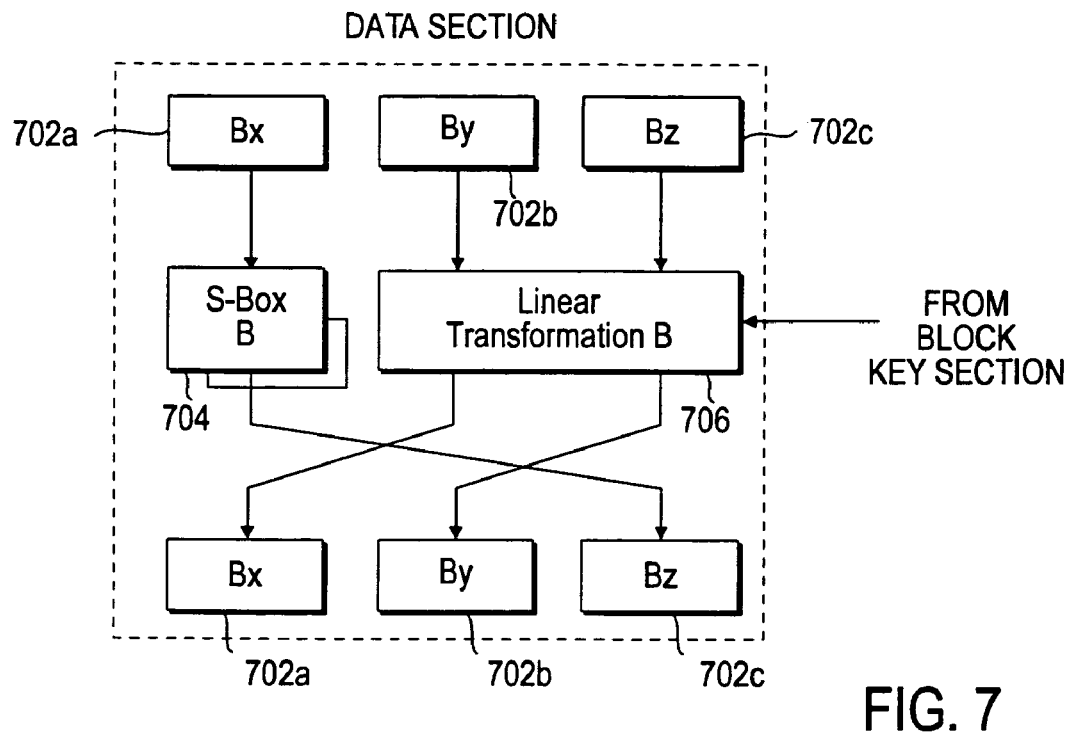
FIG. 7 illustrates the block data section of FIG. 5 in further detail, in accordance with one embodiment.

FIG. 7 illustrates the block data section of FIG. 5 in further detail, in accordance with one embodiment. For the illustrated embodiment, data section 504 is similarly constituted as block key section 502, except linear transformation unit 706 also takes into consideration the content of register 602b, when transforming the contents of registers 702b–702c. In block mode, registers 702a–702c are collectively initialized with the target plain text, e.g. earlier described random number An or derived random number Mi-1. In stream mode, registers 702a–702c are collectively initialized with a random number. Each round, substitution boxes 704 and linear transformation unit 706 modify the content of registers 702a–702c as described earlier for block key section 502 except for the differences noted above.

Again, substitution boxes 604 and linear transformation unit 606 may be implemented in a variety of ways in accordance with well known cryptographic principles.

In one implementation for the above described embodiment, each register 602a, 602b, 602c, 702a, 702b, 702c is 28-bit wide. [Whenever registers 602a–602c or 702a–702cb collectively initialized with a key value or random number less than 84 bits, the less than 84-bit number is initialized to the lower order bit positions with the higher order bit positions zero filled.] Additionally, each set of substitution boxes 604 or 704 are constituted with seven 4 input by 4 output substitution boxes. Each linear transformation unit 606 or 706 produces 56 output values by combining outputs from eight diffusion networks (each producing seven outputs). More specifically, the operation of substitution boxes 604/704 and linear transformation unit 606/706 are specified by the four tables to follow. For substitution boxes 604/704, the Ith input to box J is bit 1*7+J of register 602a/702a, and output I of box J goes to bit 1*7+j of register 602c/702c. [Bit 0 is the least significant bit.] For each diffusion network (linear transformation unit 606 as well as 706), the inputs are generally labeled I0–I6 and the outputs are labeled O0–O6. The extra inputs for each diffusion network of the linear transformation unit 706 is labeled K0–K6.

TABLE I

Substitution performed by each of the seven constituting substitution boxes of substitution boxes 604/704.

|    | 0  | 1  | 2  | 3  | 4  | 5  | 6  | 7  | 8  | 9  | 10 | 11 | 12 | 13 | 14 | 15 |
|----|----|----|----|----|----|----|----|----|----|----|----|----|----|----|----|----|
| SK | 8  | 14 | 5  | 9  | 3  | 0  | 12 | 6  | 1  | 11 | 15 | 2  | 4  | 7  | 10 | 13 |
| SK | 1  | 6  | 4  | 15 | 8  | 3  | 11 | 5  | 10 | 0  | 9  | 12 | 7  | 13 | 14 | 2  |
| SK | 13 | 11 | 8  | 6  | 7  | 4  | 2  | 15 | 1  | 12 | 14 | 0  | 10 | 3  | 9  | 5  |
| SK | 0  | 14 | 11 | 7  | 12 | 3  | 2  | 13 | 15 | 4  | 8  | 1  | 9  | 10 | 5  | 6  |
| SK | 12 | 7  | 15 | 8  | 11 | 14 | 1  | 4  | 6  | 10 | 3  | 5  | 0  | 9  | 13 | 2  |
| SK | 1  | 12 | 7  | 2  | 8  | 3  | 4  | 14 | 11 | 5  | 0  | 15 | 13 | 6  | 10 | 9  |
| SK | 10 | 7  | 6  | 1  | 0  | 14 | 3  | 13 | 12 | 9  | 11 | 2  | 15 | 5  | 4  | 8  |
| SB | 12 | 9  | 3  | 0  | 11 | 5  | 13 | 6  | 2  | 4  | 14 | 7  | 8  | 15 | 1  | 10 |
| SB | 3  | 8  | 14 | 1  | 5  | 2  | 11 | 13 | 10 | 4  | 9  | 7  | 6  | 15 | 12 | 0  |
| SB | 7  | 4  | 1  | 10 | 11 | 13 | 14 | 3  | 12 | 15 | 6  | 0  | 2  | 8  | 9  | 5  |
| SB | 6  | 3  | 1  | 4  | 10 | 12 | 15 | 2  | 5  | 14 | 11 | 8  | 9  | 7  | 0  | 13 |
| SB | 3  | 6  | 15 | 12 | 4  | 1  | 9  | 2  | 5  | 8  | 10 | 7  | 11 | 13 | 0  | 14 |
| SB | 11 | 14 | 6  | 8  | 5  | 2  | 12 | 7  | 1  | 4  | 15 | 3  | 10 | 13 | 9  | 0  |
| SB | 1  | 11 | 7  | 4  | 2  | 5  | 12 | 9  | 13 | 6  | 8  | 15 | 14 | 0  | 3  | 10 |

TABLES II & III

Diffusion networks for linear transformation unit 606/706 (continued in Table IV).

Diffusion Network Logic Function $O_0 = K_0 \oplus \oplus I_6 \quad\quad I_1 \oplus I_2 \oplus I_3 \oplus I_4 \oplus I_5$ $O_1 = K_1 \oplus I_0 \oplus \quad\quad I_2 \oplus I_3 \oplus I_4 \oplus I_5 \oplus I_6$ $O_2 = K_2 \oplus I_0 \oplus I_1 \oplus \quad\quad I_3 \oplus I_4 \oplus I_5 \oplus I_6$

TABLES II & III-continued

Diffusion networks for linear transformation unit 606/706
(continued in Table IV).

| | |
|---|---|
| $O_3$ | $K_3 \oplus I_0 \oplus I_1 \oplus I_2 \oplus \phantom{I_3 \oplus} I_4 \oplus I_5 \oplus I_6$ |
| $O_4$ | $K_4 \oplus I_0 \oplus I_1 \oplus I_2 \oplus I_3 \oplus \phantom{I_4 \oplus} I_5 \oplus I_6$ |
| $O_5$ | $K_5 \oplus I_0 \oplus I_1 \oplus I_2 \oplus I_3 \oplus I_4 \phantom{\oplus I_5} \oplus I_6$ |
| $O_6$ | $K_6 \oplus I_0 \oplus I_1 \oplus I_2 \oplus I_3 \oplus I_4 \oplus I_5 \oplus I_6$ |

| | K1 | K2 | K3 | K4 | K5 | K6 | K7 | K8 |
|---|---|---|---|---|---|---|---|---|
| $I_0$ | Kz0 | Ky0 | Ky4 | Ky8 | Ky12 | Ky16 | Ky20 | Ky24 |
| $I_1$ | Kz1 | Ky1 | Ky5 | Ky9 | Ky13 | Ky17 | Ky21 | Ky25 |
| $I_2$ | Kz2 | Ky2 | Ky6 | Ky10 | Ky14 | Ky18 | Ky22 | Ky26 |
| $I_3$ | Kz3 | Ky3 | Ky7 | Ky11 | Ky15 | Ky19 | Ky23 | Ky27 |
| $I_4$ | Kz4 | Kz7 | Kz10 | Kz13 | Kz16 | Kz19 | Kz22 | Kz25 |
| $I_5$ | Kz5 | Kz8 | Kz11 | Kz14 | Kz17 | Kz20 | Kz23 | Kz26 |
| $I_6$ | Kz6 | Kz9 | Kz12 | Kz15 | Kz18 | Kz21 | Kz24 | Kz27 |
| $O_0$ | Kx0 | Ky0 | Ky1 | Ky2 | Ky3 | Kx7 | Kx8 | Kx9 |
| $O_1$ | Kx1 | Ky4 | Ky5 | Ky6 | Ky7 | Kx10 | Kx11 | Kx12 |
| $O_2$ | Kx2 | Ky8 | Ky9 | Ky10 | Ky11 | Kx13 | Kx14 | Kx15 |
| $O_3$ | Kx3 | Ky12 | Ky13 | Ky14 | Ky15 | Kx16 | Kx17 | Kx18 |
| $O_4$ | Kx4 | Ky16 | Ky17 | Ky18 | Ky19 | Kx19 | Kx20 | Kx21 |
| $O_5$ | Kx5 | Ky20 | Ky21 | Ky22 | Ky23 | Kx22 | Kx23 | Kx24 |
| $O_6$ | Kx6 | Ky24 | Ky25 | Ky26 | Ky27 | Kx25 | Kx26 | Kx27 |

TABLE IV

Diffusion networks for linear transformation unit 606/706
(continued from Tables II & III).

| | B1 | B2 | B3 | B4 | B5 | B6 | B7 | B8 |
|---|---|---|---|---|---|---|---|---|
| $I_0$ | Bz0 | By0 | By4 | By8 | By12 | By16 | By20 | By24 |
| $I_1$ | Bz1 | By1 | By5 | By9 | By13 | By17 | By21 | By25 |
| $I_2$ | Bz2 | By2 | By6 | By10 | By14 | By18 | By22 | By26 |
| $I_3$ | Bz3 | By3 | By7 | By11 | By15 | By19 | By23 | By27 |
| $I_4$ | Bz4 | Bz7 | Bz10 | Bz13 | Bz16 | Bz19 | Bz22 | Bz25 |
| $I_5$ | Bz5 | Bz8 | Bz11 | Bz14 | Bz17 | Bz20 | Bz23 | Bz26 |
| $I_6$ | Bz6 | Bz9 | Bz12 | Bz15 | Bz18 | Bz21 | Bz24 | Bz27 |
| $K_0$ | Ky0 | — | — | — | — | Ky7 | Ky14 | Ky21 |
| $K_1$ | Ky1 | — | — | — | — | Ky8 | Ky15 | Ky22 |
| $K_2$ | Ky2 | — | — | — | — | Ky9 | Ky16 | Ky23 |
| $K_3$ | Ky3 | — | — | — | — | Ky10 | Ky17 | Ky24 |
| $K_4$ | Ky4 | — | — | — | — | Ky11 | Ky18 | Ky25 |
| $K_5$ | Ky5 | — | — | — | — | Ky12 | Ky19 | Ky26 |
| $K_6$ | Ky6 | — | — | — | — | Ky13 | Ky20 | Ky27 |
| $O_0$ | Bx0 | By0 | By1 | By2 | By3 | Bx7 | Bx8 | Bx9 |
| $O_1$ | Bx1 | By4 | By5 | By6 | By7 | Bx10 | Bx11 | Bx12 |
| $O_2$ | Bx2 | By8 | By9 | By10 | By11 | Bx13 | Bx14 | Bx15 |
| $O_3$ | Bx3 | By12 | By13 | By14 | By15 | Bx16 | Bx17 | Bx18 |
| $O_4$ | Bx4 | By16 | By17 | By18 | By19 | Bx19 | Bx20 | Bx21 |
| $O_5$ | Bx5 | By20 | By21 | By22 | By23 | Bx22 | Bx23 | Bx24 |
| $O_6$ | Bx6 | By24 | By25 | By26 | By27 | Bx25 | Bx26 | Bx27 |

Referring now back to FIG. 5, recall that a ciphered text may be deciphered by generating the intermediate "keys" and applying them backward. Alternatively, for an embodiment where either the inverse of substitution boxes 604/704 and linear transformation units 606/706 are included or they may be dynamically reconfigured to operate in an inverse manner, the ciphered text may be deciphered as follows. First, the cipher key used to cipher the plain text is loaded into block key section 502, and block key section 502 is advanced by R−1 rounds, i.e. one round short of the number of rounds (R) applied to cipher the plain text. After the initial R−1 rounds, the ciphered text is loaded into data section 504, and both sections, block key section 502 and data section 504, are operated "backward", i.e. with substitution boxes 604/704 and linear transformation units 606/706 applying the inverse substitutions and linear transformations respectively.

Figure 8A:
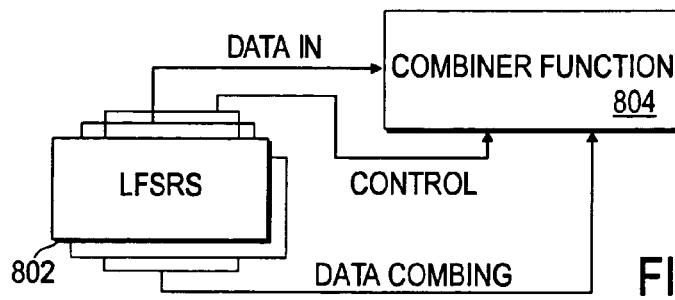
FIGS. 8a–8c illustrate the stream data section of FIG. 5 in further detail, in accordance with one embodiment.
Figure 8B:
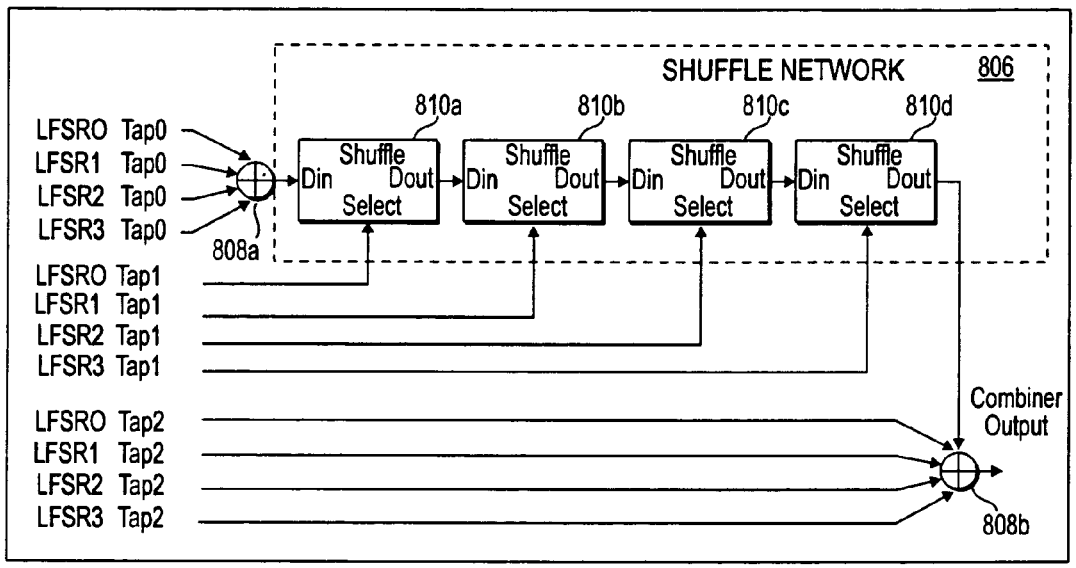
Figure 8C:
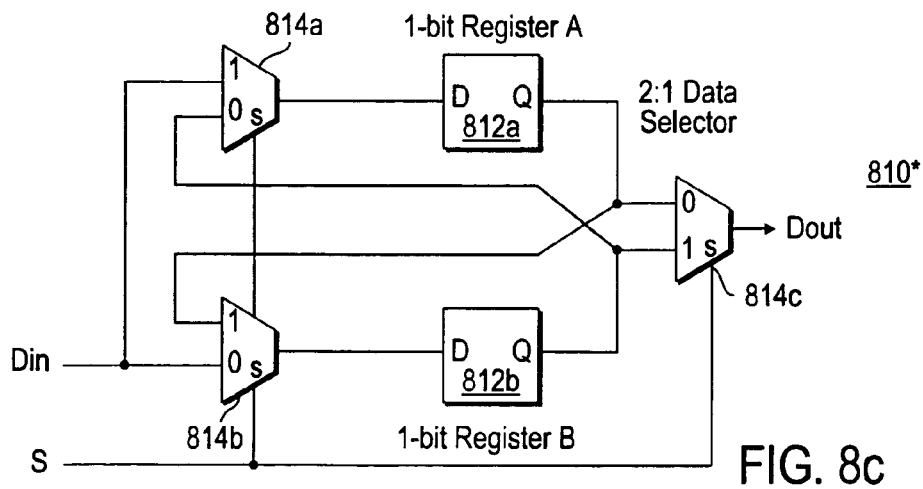

FIGS. 8*a*–8*c* illustrate the stream key section of FIG. 5 in further detail, in accordance with one embodiment. As illustrated in FIG. 8*a*, stream key section 506 includes a number of linear feedback shift registers (LFSRs) 802 and combiner function 804, coupled to each other as shown. LFSRs 802 are collectively initialized with a stream cipher key, e.g. earlier described frame key Ki. During operation, the stream cipher key is successively shifted through LFSRs 802. Selective outputs are taken from LFSRs 802, and combiner function 804 is used to combine the selective outputs. In stream mode (under which, rekeying is enabled), the combined result is used to dynamically modify a then current state of a block cipher key in block key section 502.

For the illustrated embodiment, four LFSRs of different lengths are employed. Three sets of outputs are taken from the four LFSRs. The polynomials represented by the LFSR and the bit positions of the three sets of LFSR outputs are given by the table to follows:

TABLE V

Polynomials of the LFSR and tap positions.

| | | | Combining Function Taps | |
|---|---|---|---|---|
| LFSR | Polynomial | 0 | 1 | 2 |
| 3 | $X^{17} + x^{15} + x^{11} + x^5 + 1$ | 6 | 12 | 17 |
| 2 | $X^{16} + x^{15} + x^{12} + x^8 + x^7 + x^5 + 1$ | 6 | 10 | 16 |
| 1 | $X^{14} + x^{11} + x^{10} + x^7 + x^6 + x^4 + 1$ | 5 | 9 | 14 |
| 0 | $X^{13} + x^{11} + x^9 + x^5 + 1$ | 4 | 8 | 13 |

The combined result is generated from the third set of LFSR outputs, using the first and second set of LFSR outputs as data and control inputs respectively to combiner function 802. The third set of LFSR outputs are combined into a single bit. In stream mode (under which, rekeying is enabled), the combined single bit is then used to dynamically modify a predetermined bit of a then current state of a block cipher key in block key section 502.

FIG. 8*b* illustrates combiner function 804 in further detail, in accordance with one embodiment. As illustrated, combiner function 804 includes shuffle network 806 and XOR 808*a*–808*b*, serially coupled to each other and LFSRs 802 as shown. For the illustrated embodiment, shuffle network 806 includes four binary shuffle units 810*a*–810*d* serially coupled to each other, with first and last binary shuffle units 810*a* and 810*d* coupled to XOR 808*a* and 808*b* respectively. XOR 808*a* takes the first group of LFSR outputs and combined them as a single bit input for shuffle network 806. Binary shuffle units 810*a*–810*d* serially propagate and shuffle the output of XOR 808*a*. The second group of LFSR outputs are used to control the shuffling at corresponding ones of binary shuffle units 810*a*–810*d*. XOR 808*b* combines the third set of LFSR outputs with the output of last binary shuffle unit 810*d*.

FIG. 8*c* illustrates one binary shuffle unit 810* (where * is one of a–d) in further detail, in accordance with one embodiment. Each binary shuffle unit 810* includes two flip-flops 812a and 812b, and a number of selectors 814a–814c, coupled to each other as shown. Flip-flops 812a and 812b are used to store two state values (A, B). Each selector 814a, 814b or 814c receives a corresponding one of the second group of LFSR outputs as its control signal. Selector 814a–814b also each receives the output of XOR 808a or an immediately preceding binary shuffle unit 810* as input. Selector 814a–814b are coupled to flip-flops 812a–812b to output one of the two stored state values and to shuffle as well as modify the stored values in accordance with the state of the select signal. More specifically, for the illustrated embodiment, if the stored state values are (A, B), and the input and select values are (D, S), binary shuffle unit 810* outputs A, and stores (B, D) if the value of S is "0". Binary shuffle unit 810* outputs B, and stores (D, A) if the value of S is "1".

Referring now to back to FIG. 5, as illustrated and described earlier, mapping function 508 generates the pseudo random bit sequence based on the contents of selected registers of block key section 502 and data section 504. In one embodiment, where block key section 502 and data section 504 are implemented in accordance with the respective embodiments illustrated in FIG. 6–7, mapping function 508 generates the pseudo random bit sequence at 24-bit per clock based on the contents of registers (Ky and Kz) 602b–602c and (By and Bz) 702b–702c. More specifically, each of the 24 bits is generated by performing the XOR operation on nine terms in accordance with the following formula:

$$(B0 \cdot K0) \oplus (B1 \cdot K1) \oplus (B2 \cdot K2) \oplus (B3 \cdot K3) \oplus (B4 \cdot K4) \oplus (B5 \cdot K5) \oplus (B6 \cdot K6) \oplus B7 \cdot K7$$

Where "$\oplus$" represents a logical XOR function, "•" represents a logical AND function, and the input values B and K for the 24 output bits are Accordingly, a novel method and apparatus for ciphering and deciphering video content to protect the video content from unauthorized copying during transmission has been described.

Epilogue

From the foregoing description, those skilled in the art will recognize that many other variations of the present invention are possible. In particular, while the present invention has been described as being implemented in interfaces 108a and 108b, some of the logic may be distributed in other components of video source and sink devices 102 and 104. Additionally, non-LFSR based stream key section, more or less block key registers, larger or smaller block key registers, more or less substitution units, including alternative substitution patterns, as well as different linear transformation units may be employed. Thus, the present invention is not limited by the details described, instead, the present invention can be practiced with modifications and alterations within the spirit and scope of the appended claims.

What is claimed is:

1. A method, comprising:
generating a plurality of frame keys based on a session key generated for a transmission session within which a video content having a plurality of frames is to be transmitted to a video sink device, each of the frame keys being generated specifically for each of the frames respectively; and
ciphering each of the frames using a respective one of the frame keys prior to transmitting the respective ciphered frame to the video sink device.

2. The method of claim 1, wherein each of the frame keys is generated during each vertical blanking interval of the video content.

| | | | | | | | Input Origin | | | | | | | | | |
|---|---|---|---|---|---|---|---|---|---|---|---|---|---|---|---|---|
| Output bit | B0 Bz | B1 Bz | B2 Bz | B3 Bz | B4 Bz | B5 Bz | B6 Bz | B7 By | K0 Kz | K1 Kz | K2 Kz | K3 Kz | K4 Kz | K5 Kz | K6 Kz | K7 Ky |
| 0 | 14 | 23 | 7 | 27 | 3 | 18 | 8 | 20 | 12 | 24 | 0 | 9 | 16 | 7 | 20 | 13 |
| 1 | 20 | 26 | 6 | 15 | 8 | 19 | 0 | 10 | 26 | 18 | 1 | 11 | 6 | 20 | 12 | 19 |
| 2 | 7 | 20 | 2 | 10 | 19 | 14 | 26 | 17 | 1 | 22 | 8 | 13 | 7 | 16 | 25 | 3 |
| 3 | 22 | 12 | 6 | 17 | 3 | 10 | 27 | 4 | 24 | 2 | 9 | 5 | 14 | 18 | 21 | 15 |
| 4 | 22 | 24 | 14 | 18 | 7 | 1 | 9 | 21 | 19 | 24 | 20 | 8 | 13 | 6 | 3 | 5 |
| 5 | 12 | 1 | 16 | 5 | 10 | 24 | 20 | 14 | 27 | 2 | 8 | 16 | 15 | 22 | 4 | 21 |
| 6 | 5 | 3 | 27 | 8 | 17 | 15 | 21 | 12 | 14 | 23 | 16 | 10 | 27 | 1 | 7 | 17 |
| 7 | 9 | 20 | 1 | 16 | 5 | 25 | 12 | 6 | 9 | 13 | 22 | 17 | 1 | 24 | 5 | 11 |
| 8 | 23 | 25 | 11 | 13 | 17 | 1 | 6 | 22 | 25 | 21 | 18 | 15 | 6 | 11 | 1 | 10 |
| 9 | 4 | 0 | 22 | 17 | 25 | 10 | 15 | 18 | 0 | 20 | 26 | 19 | 4 | 15 | 9 | 27 |
| 10 | 23 | 25 | 9 | 2 | 13 | 16 | 4 | 8 | 2 | 11 | 27 | 19 | 14 | 22 | 4 | 7 |
| 11 | 3 | 6 | 20 | 12 | 25 | 19 | 10 | 27 | 24 | 3 | 14 | 6 | 23 | 17 | 10 | 1 |
| 12 | 26 | 1 | 18 | 21 | 14 | 4 | 10 | 0 | 17 | 7 | 26 | 0 | 23 | 11 | 14 | 8 |
| 13 | 2 | 11 | 4 | 21 | 15 | 24 | 18 | 9 | 5 | 16 | 12 | 2 | 26 | 23 | 11 | 6 |
| 14 | 22 | 24 | 3 | 19 | 11 | 4 | 13 | 5 | 22 | 0 | 18 | 8 | 25 | 5 | 15 | 2 |
| 15 | 12 | 0 | 27 | 11 | 22 | 5 | 16 | 1 | 10 | 3 | 15 | 19 | 21 | 27 | 6 | 18 |
| 16 | 24 | 20 | 2 | 7 | 15 | 18 | 8 | 3 | 12 | 20 | 5 | 19 | 1 | 27 | 8 | 23 |
| 17 | 12 | 16 | 8 | 24 | 7 | 2 | 21 | 23 | 17 | 2 | 11 | 14 | 7 | 25 | 22 | 16 |
| 18 | 19 | 3 | 22 | 9 | 13 | 6 | 25 | 7 | 4 | 10 | 2 | 17 | 21 | 24 | 13 | 22 |
| 19 | 11 | 17 | 13 | 26 | 4 | 21 | 2 | 16 | 3 | 4 | 13 | 26 | 18 | 23 | 9 | 25 |
| 20 | 17 | 23 | 26 | 14 | 5 | 11 | 0 | 15 | 26 | 3 | 9 | 19 | 21 | 12 | 6 | 0 |
| 21 | 9 | 14 | 23 | 16 | 27 | 0 | 6 | 24 | 18 | 21 | 3 | 27 | 4 | 10 | 15 | 26 |
| 22 | 7 | 21 | 8 | 13 | 1 | 26 | 19 | 25 | 25 | 0 | 12 | 10 | 7 | 17 | 23 | 9 |
| 23 | 27 | 15 | 23 | 5 | 0 | 9 | 18 | 11 | 8 | 0 | 25 | 20 | 16 | 5 | 13 | 12 |

3. The method of claim 2, further comprising generating a pseudo random bit sequence for each frame to cipher the respective frame of the video content using at least the respective frame key.

4. The method of claim 3, further comprising modifying the respective frame key according to a predetermined algorithm during a horizontal blanking interval of the respective frame to generate the pseudo random bit sequence.

5. The method of claim 3, further comprising deriving a random number from the pseudo random bit sequence, the derived random number being used to generate a frame key for a frame succeeding the corresponding frame.

6. The method of claim 5, wherein each of the frame keys is generated based on a random number derived from a pseudo random bit sequence of a preceding frame and the session key.

7. The method of claim 5, wherein each of the pseudo random bit sequences is generated based on a random number derived from a pseudo random bit sequence of a preceding frame and the frame key of a current frame.

8. The method of claim 1, further comprising generate the session key for the transmission session of the video content.

9. A machine-readable medium having executable code to cause a machine to perform a method, the method comprising:
generating a plurality of frame keys based on a session key generated for a transmission session within which a video content having a plurality of frames is to be transmitted to a video sink device, each of the frame keys being generated specifically for each of the frames respectively; and
ciphering each of the frames using a respective one of the frame keys prior to transmitting the respective ciphered frame to the video sink device.

10. The machine-readable medium of claim 9, wherein each of the frame keys is generated during each vertical blanking interval of the video content.

11. The machine-readable medium of claim 10, wherein the method further comprises generating a pseudo random bit sequence for each frame to cipher the respective frame of the video content using at least the respective frame key.

12. The machine-readable medium of claim 11, wherein the method further comprises modifying the respective frame key according to a predetermined algorithm during a horizontal blanking interval of the respective frame to generate the pseudo random bit sequence.

13. The machine-readable medium of claim 11, wherein the method further comprises deriving a random number from the pseudo random bit sequence, the derived random number being used to generate a frame key for a frame succeeding the corresponding frame.

14. The machine-readable medium of claim 13, wherein each of the frame keys is generated based on a random number derived from a pseudo random bit sequence of a preceding frame and the session key.

15. The machine-readable medium of claim 13, wherein each of the pseudo random bit sequences is generated based on a random number derived from a pseudo random bit sequence of a preceding frame and the frame key of a current frame.

16. The machine-readable medium of claim 9, further comprising generate the session key for the transmission session of the video content.

17. An apparatus comprising:
a block cipher to generate a plurality of frame keys based on a session key generated for a transmission session within which a video content having a plurality of frames is to be transmitted to a video sink device, each of the frame keys being generated for each of the frames respectively; and
a stream cipher coupled to the block cipher to cipher each of the frames using a respective frame key prior to transmitting the respective frame to the video sink device.

18. The apparatus of claim 17, wherein the stream cipher further generates a pseudo random bit sequence for each frame using at least the corresponding frame key, the pseudo random bit sequence being used to cipher the respective frame.

19. The apparatus of claim 17, wherein the stream cipher comprises a register to successively store a frame key associated with each frame.

20. The apparatus of claim 19, wherein the stream cipher further comprises a stream key section coupled to the register to be programmed with a frame key, to generate first data bits to successively modify the register stored frame key to facilitate generation of the pseudo random bit sequence for the frame.

21. The apparatus of claim 19, wherein the stream cipher further comprises a first function block coupled to the register to successively transform a stored frame key and a second function block coupled to the register to generate a pseudo random bit sequence for the corresponding frame using a selected subset of each of the transformed states of the frame key.

22. The apparatus of claim 17, wherein the block cipher comprises a first and a second registers to store a first and a second values, and a function block coupled to the first and second registers to transform the stored first and second values, with a selected one of the transformed first and second values being one of the session key and a frame key.

23. The apparatus of claim 22, wherein the block cipher is an integral part of the stream cipher.

24. A method, comprising:
generating a plurality of frame keys based on a session key generated for a reception session within which a video content having a plurality of frames is to be received from a video source device, each of the frame keys being generated for each of the frames within the reception session; and
deciphering each of the frames using the corresponding frame key as a decipher key to recover the respective frame of the video content.

25. The method of claim 24, wherein each of the frame keys are generated at each vertical blanking interval of the video content.

26. The method of claim 25, further comprising generating a pseudo random bit sequence for each frame using at least the corresponding frame key to decipher the respective frame of the video content.

27. The method of claim 26, further comprising successively modifying the respective frame key during a horizontal blanking interval of the respective frame.

28. The method of claim 26, further comprising deriving a random number from the pseudo random bit sequence, the derived random number being used to generate a frame key for a frame succeeding the corresponding frame.

29. The method of claim 26, wherein each of the frame keys is generated based on a random number derived from a pseudo random bit sequence of a preceding frame and the session key.

30. The method of claim 29, wherein each of the pseudo random bit sequences is generated based on a random number derived from a pseudo random bit sequence of a preceding frame and the frame key of a current frame.

31. A machine-readable medium having executable code to cause a machine to perform a method, the method comprising:
generating a plurality of frame keys based on a session key generated for a reception session within which a video content having a plurality of frames is to be received from a video source device, each of the frame keys being generated for each of the frames within the reception session; and
deciphering each of the frames using the corresponding frame key as a decipher key to recover the respective frame of the video content.

32. The machine-readable medium of claim 31, wherein each of the frame keys are generated at each vertical blanking interval of the video content.

33. The machine-readable medium of claim 32, wherein the method further comprises generating a pseudo random bit sequence for each frame using at least the corresponding frame key to decipher the respective frame of the video content.

34. The machine-readable medium of claim 33, wherein the method further comprises successively modifying the respective frame key during a horizontal blanking interval of the respective frame.

35. The machine-readable medium of claim 33, wherein the method further comprises deriving a random number from the pseudo random bit sequence, the derived random number being used to generate a frame key for a frame succeeding the corresponding frame.

36. The machine-readable medium of claim 33, wherein each of the frame keys is generated based on a random number derived from a pseudo random bit sequence of a preceding frame and the session key.

37. The machine-readable medium of claim 36, wherein each of the pseudo random bit sequences is generated based on a random number derived from a pseudo random bit sequence of a preceding frame and the frame key of a current frame.

38. An apparatus, comprising:
a block decipher to generate a plurality of frame keys based on a session key of a reception session within which a video content having a plurality of frames is to be received from a video source device, each of the frame keys being generated for each of the frames respectively; and
a stream decipher coupled to the block decipher to decipher each of the frames of the video content using each of the frame keys respectively.

39. The apparatus of claim 38, wherein the stream decipher further generates a pseudo random bit sequence for each frame using at least the corresponding frame key, the pseudo random bit sequence being used to decipher the respective frame of the video content.

40. The apparatus of claim 38, wherein the stream decipher comprises a register to successively store a frame key associated with each frame.

41. The apparatus of claim 40, wherein the stream decipher further comprises a stream key section coupled to the register to be programmed with a frame key associated with the respective frame, to generate first data bits to successively modify the register stored frame key to facilitate generation of the pseudo random bit sequence for the frame.

42. The apparatus of claim 40, wherein the stream decipher further comprises a first function block coupled to the register to successively transform a stored frame key, and a second function block coupled to the register to generate the pseudo random bit sequence for the corresponding frame using a selected subset of each of the transformed states of the frame key.

43. The apparatus of claim 40, wherein the block decipher comprises a first and a second registers to store a first and a second values, and a function block coupled to the first and second registers to successively transform the stored first and second values, with a selected one of the transformed first and second values being the session key or a frame key.

44. The apparatus of claim 43, wherein the block decipher is an integral part of the stream decipher.

45. A machine-readable medium having executable code to cause a machine to perform a method of a video source device, the method comprising:
generating a session key for a transmission session within which a multi-frame video content is to be transmitted to a video sink device;
generating a successive number of frame keys, using at least the session key, each of the frame keys being distinctively generated for each of the frames of the transmission session; and
ciphering each of the frames using the corresponding frame key prior to transmitting the respective ciphered frame to the video sink device.

46. The machine-readable medium of claim 45, wherein said generating of successive frame keys comprises generating at each vertical blanking interval of said multi-frame video content, a frame key for ciphering a frame of said multi-frame video content.

47. The machine-readable medium of claim 46, wherein said method further comprises generating a pseudo random bit sequence for each frame, using at least the corresponding frame key, for ciphering the particular frame of said multi-frame video content.

48. The machine-readable medium of claim 47, wherein the method further comprises modifying the corresponding frame key according to a predetermined algorithm during a horizontal blanking interval of the respective frame, to generate the pseudo random bit sequence.

49. The machine-readable medium of claim 47, wherein the method further comprises deriving a random number from the pseudo random bit sequence, the derived random number being used to generate a frame key for a frame succeeding the corresponding frame.

50. The machine-readable medium of claim 49, wherein each of the frame keys is generated based on a random number derived from a pseudo random bit sequence of a preceding frame and the session key.

51. The machine-readable medium of claim 49, wherein each of the pseudo random bit sequences is generated based on a random number derived from a pseudo random bit sequence of a preceding frame and the frame key of a current frame.

52. A machine-readable medium having executable code to cause a machine to perform a method of a video sink device, the method comprising:
generating a session key for a reception session within which a multi-frame video content is to be received from a video source device, the session key being valid only for the reception session;
generating a successive number of frame keys, using at least the session key, each of the frame keys being distinctively generated for each of the frames within the reception session; and deciphering each of the frames using the corresponding frame key as a decipher key to recover the multi-frame video content.

53. The machine-readable medium of claim 52, wherein said generating of successive frame keys comprises generating at each vertical blanking interval of said multi-frame video content, a frame key for deciphering a frame of said multi-frame video content.

54. The machine-readable medium of claim 53, wherein said method further comprises generating a pseudo random bit sequence for each frame, using at least the corresponding frame key, for deciphering the particular frame of said multi-frame video content.

55. The method of claim 54, wherein each of said generating of a pseudo random bit sequence using a corresponding frame key comprises successive modifications of the frame key during a horizontal blanking interval of the respective frame.

56. The method of claim 54, further comprising deriving a random number from the pseudo random bit sequence, the derived random number being used to generate a frame key for a frame succeeding the corresponding frame.

57. The method of claim 54, wherein each of the frame keys is generated based on a random number derived from a pseudo random bit sequence of a preceding frame and the session key.

58. The method of claim 57, wherein each of the pseudo random bit sequences is generated based on a random number derived from a pseudo random bit sequence of a preceding frame and the frame key of a current frame.

* * * * *